US012753284B2

(12) United States Patent
Reithmeier et al.

(10) Patent No.: US 12,753,284 B2
(45) Date of Patent: Oct. 6, 2026

(54) METHOD FOR THE PRODUCTION OF A POLYURETHANE SANDWICH ELEMENT

(71) Applicant: Covestro Deutschland AG, Leverkusen (DE)

(72) Inventors: Richard Reithmeier, Cologne (DE); Andreas Hoffmann, Pulheim (DE); Heike Niederelz, Leichlingen (DE); Harald Rasselnberg, Dormagen (DE); Thorsten Josef Kraus, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 96 days.

(21) Appl. No.: 18/702,933

(22) PCT Filed: Oct. 26, 2022

(86) PCT No.: PCT/EP2022/079956

§ 371 (c)(1),
(2) Date: Apr. 19, 2024

(87) PCT Pub. No.: WO2023/078758

PCT Pub. Date: May 11, 2023

(65) Prior Publication Data

US 2025/0263526 A1 Aug. 21, 2025

(30) Foreign Application Priority Data

Nov. 3, 2021 (EP) .................................... 21206231

(51) Int. Cl.

| | |
|---|---|
| ***C08J 5/24*** | (2006.01) |
| ***B32B 3/12*** | (2006.01) |
| ***B32B 27/12*** | (2006.01) |
| ***B32B 27/40*** | (2006.01) |
| ***C08G 18/32*** | (2006.01) |
| ***C08G 18/48*** | (2006.01) |
| ***C08G 18/66*** | (2006.01) |
| ***C08G 18/76*** | (2006.01) |
| ***C08K 5/09*** | (2006.01) |
| ***C08K 5/101*** | (2006.01) |

(52) U.S. Cl.

CPC ................. *C08J 5/244* (2021.05); *B32B 3/12* (2013.01); *B32B 27/12* (2013.01); *B32B 27/40* (2013.01); *C08G 18/3206* (2013.01); *C08G 18/4816* (2013.01); *C08G 18/4829* (2013.01); *C08G 18/4837* (2013.01); *C08G 18/6674* (2013.01); *C08G 18/7671* (2013.01); *C08K 5/09* (2013.01); *C08K 5/101* (2013.01); *B32B 2250/03* (2013.01); *B32B 2250/40* (2013.01); *C08J 2375/08* (2013.01)

(58) Field of Classification Search

CPC ............ C08G 18/3206; C08G 18/4816; C08G 18/4829; C08G 18/4837; C08G 18/6674

See application file for complete search history.

(56) References Cited

U.S. PATENT DOCUMENTS

| | | | | |
|---|---|---|---|---|
| 5,389,696 A | 2/1995 | Dempsey et al. | | |
| 5,500,176 A | 3/1996 | Parks et al. | | |
| 5,670,553 A | 9/1997 | Mackey | | |
| 8,808,485 B2 | 8/2014 | James et al. | | |
| 2001/0005736 A1 | 6/2001 | Rothacker | | |
| 2008/0020194 A1* | 1/2008 | Younes | C08G 18/5024 | 428/301.4 |
| 2008/0058468 A1* | 3/2008 | Younes | C08G 18/482 | 524/589 |
| 2020/0324529 A1 | 10/2020 | Zhu et al. | | |
| 2023/0250215 A1* | 8/2023 | Reithmeier | C08G 18/4825 | 524/95 |

FOREIGN PATENT DOCUMENTS

WO WO-2013127850 A1 * 9/2013 ................ C08J 5/04

OTHER PUBLICATIONS

International Search Report, PCT/EP2022/079956, date of mailing: Sep. 3, 2023, Authorized officer: Luis Nazario.

* cited by examiner

*Primary Examiner* — Michael L Leonard
(74) *Attorney, Agent, or Firm* — Donald R. Palladino

(57) ABSTRACT

The invention relates to an isocyanate-reactive composition comprising an internal release agent, a method for production of a polyurethane sandwich element using the isocyanate-reactive composition, use of the isocyanate-reactive composition in the method for production of a polyurethane sandwich element and the polyurethane sandwich element.

20 Claims, No Drawings

METHOD FOR THE PRODUCTION OF A POLYURETHANE SANDWICH ELEMENT

CROSS-REFERENCE TO RELATED APPLICATION

This application is a national stage application under 35 U.S.C. § 371 of PCT/EP2022/079956, filed Oct. 26, 2022, which claims the benefit of European Application No. 21206231.9, filed Nov. 3, 2021, each of which being incorporated herein by reference.

FIELD

The present invention relates to a polyurethane sandwich element, a method for its production and use of an internal mold release comprising a first and a second internal mold release agent for its production.

BACKGROUND

Processes for the production of sandwich elements for the fabrication of flat sheets have been known for some time. The sandwich construction is made up of a light and compression-resistant core with high-strength covering layers. This composite structure is formed by a polyurethane (PU) reaction mixture which, when applied to the covering layers in a compression molding process, can form an indissoluble bond. The inner core layer of the sandwich structure is preferably made up of cardboard with a honeycomb structure, which during the compression procedure acts as a spacer for the covering layers wetted with PU.

The wetting of the sandwich covering layers is preferably affected by spraying. During the PU application by means of a mixing head the substrate carrier is arranged in the horizontal or preferably in the vertical position, since in this orientation a double-sided application can be carried out at the same time. The substrate carrier and/or the polyurethane mixing head may be robot-guided.

Three-dimensional sandwich elements can also be produced due to the combination of compression and shaping processes. The honeycomb core, which for sheet materials is built up over the whole surface to a uniform thickness of from several millimeters to several centimeters, is now compressed in partial regions by a small percentage of its original size. The shaping of the outer contour of the finished part is effected by a nipping-off of the sandwich structure by pinch edging in the shaping tool (mold), so that the structural part has closed outer edges after removal from the mold. In this shaping process, a three-dimensional structural part is obtained that has unlaminated visible surfaces and also unlaminated visible edges.

A method for production of PU sandwich elements is known per se. However, there are problems that need to be overcome in the art. These problems include a dilemma between demolding performance (also referred to as "release properties") of the PU product and phase stability of the isocyanate-reactive composition employed in the PU reaction mixture: a high amount of internal mold release in the isocyanate-reactive composition will result in good demolding performance of the resulting sandwich element but will result in insufficient phase stability of the isocyanate-reactive composition. Phase stable compositions are preferred due to, e.g., easier handling, avoidance of time and energy consuming additional homogenization steps or filter elements and/or more constant quality of the composition. On the contrary, isocyanate-reactive composition comprising so small amounts of internal mold release as to be phase stable result in deteriorated demolding performance of the resulting sandwich elements. Enhanced demolding performance is preferred due to, e.g., reduction of necessary cleaning of the mold, quicker demolding procedures and/or increased productivity of the production process.

WO 2012/015583 discloses a method for production of PU sandwich elements in which high amounts of internal mold release are employed in the isocyanate-reactive composition so that the risk of phase instability is increased.

WO 2017/216251 discloses a method for production of PU sandwich elements in which low amounts of internal mold release are employed in the isocyanate-reactive composition. While the isocyanate-reactive composition may be phase stable, demolding performance of the resulting sandwich element may be desired to be increased.

SUMMARY

Therefore, it was the task of the present invention to provide a method for the production of a polyurethane sandwich element in which at least one of the disadvantages of prior art methods is overcome and an isocyanate-reactive composition which enables said method.

Surprisingly, it was found that use of a combination of at least two different internal mold release agents in a specific amount in an isocyanate-reactive composition provided a phase stable isocyanate-reactive composition resulting in enhanced demolding performance in the resulting sandwich element.

The task was solved by an isocyanate-reactive composition B comprising

- B1 at least one isocyanate-reactive component having at least two reactive hydrogen atoms;
- B2 more than 5.0 to less than 9.0 wt % internal mold release, based on the amount of isocyanate-reactive composition B, wherein the internal mold release comprises
  - B2a a first internal mold release agent; and
  - B2b a second internal mold release agent which is a fatty acid and different from B2a.

According to the invention, the isocyanate-reactive composition B comprises at least one isocyanate-reactive component having at least two reactive hydrogen atoms B1 and internal mold release B2 in an amount of more than 5.0 to less than 9.0 wt %, based on the amount of isocyanate-reactive composition B, wherein the internal mold release comprises a first internal mold release agent B2a and a second internal mold release agent B2b which is a fatty acid and which is different from B2a.

DESCRIPTION

In the context of this invention, a reactive hydrogen atom is a hydrogen atom of a moiety which can react with an isocyanate moiety, e.g., a hydrogen atom of —OH or $—NH_2$ moieties.

A mold release or mold release agent is per se known to the skilled person. It facilitates demolding of a molded product from the mold the molded product was molded in. Herein, the terms "internal mold release" or "internal mold release agent" refer to a mold release or mold release agent which is employed as part of the polyurethane-forming mixture, contrary to an external mold release (agent) which would be applied separately to the surface of the mold in which the sandwich structure is placed according to the method of the invention.

In one embodiment of the invention, the first internal mold release agent B2a is a fatty acid ester In one embodiment of the invention, the amount of the first internal mold release agent B2a is 2.0-8.0 wt %, preferably 4.0-7.0 wt %, most preferably 4.5-6.0 wt %, based on the amount of isocyanate-reactive composition B.

In one embodiment of the invention, the amount of the second internal mold release agent B2b is 0.50-6.0 wt %, preferably 1.0-4.0 wt %, most preferably 1.5-2.5 wt %, based on the amount of isocyanate-reactive composition B.

In one embodiment of the invention, the amount of B2 internal mold release is 5.5-8.5, wt %, preferably 6.0-8.0 wt %, more preferably 6.5-7.5 wt %, based on the amount of isocyanate-reactive composition B.

The inventive isocyanate-reactive composition B comprises at least one isocyanate-reactive component having at least two reactive hydrogen atoms B1. In principle, any isocyanate-reactive component suitable for use in the production of polyurethanes are acceptable, such as polyols or amines, specifically polyether polyols, polyester polyols, polycarbonate polyols, polyether ester polyols or polyether carbonate polyols. Especially preferred are polyether polyols. These suitable polyols are known to the skilled person.

Suitable polyether polyols include addition products of the reaction of styrene oxide, ethylene oxide, propylene oxide, butylene oxide and/or epichlorohydrin with di- or polyfunctional starter compounds, such as alcohols, amines, thiols, or mixtures of the foregoing. Preferred starter compounds include carbohydrates such as sorbitol or sucrose, mixtures thereof or mixtures of carbohydrates, especially sorbitol or sucrose, and low molecular weight alcohols such as ethylene glycol, diethylene glycol or propylene glycol.

Suitable polyester polyols include polycondensates of di-, tri- or tetrafunctional alcohols with di-, tri- or tetrabasic carboxylic acids or hydroxycarboxylic acids. In lieu of free polycarboxylic acids, the respective polycarboxylic acid anhydrides or polycarboxylic acid esters of lower alcohols may be employed in the production of polyester polyols.

Suitable polyether ester polyols are those compounds which contain ether groups, ester groups and OH groups. Organic dicarboxylic acids having up to 12 carbon atoms or derivatives thereof are suitable for the preparation of these polyether ester polyols. Polyether polyols which are obtained by alkoxylating starter molecules, such as polyhydric alcohols, are used as a further component for the preparation of the polyether ester polyols. The starter molecules are at least difunctional, but may optionally also contain proportions of higher-functional, in particular trifunctional, starter molecules. Polyether ester polyols can also be prepared by the alkoxylation of reaction products obtained by the reaction of organic dicarboxylic acids and their derivatives and components with reactive hydrogens.

Polycarbonate polyols which can be used are polycarbonates containing hydroxyl groups, for example polycarbonate diols. These are obtainable by reacting carbonic acid derivatives, such as diphenyl carbonate, dimethyl carbonate or phosgene, with polyols, preferably diols, or by copolymerizing alkylene oxides, such as propylene oxide, with $CO_2$.

Instead of or in addition to pure polycarbonate diols, polyether carbonate polyols can also be used which are obtainable, for example, by copolymerization of a starter compound with alkylene oxides and $CO_2$.

In one embodiment of the invention, the at least one isocyanate-reactive component having at least two reactive hydrogen atoms B1 comprises B1a a polyether polyol with an OH number of 700-1000 mg KOH/g and a functionality of 2.0-4.0, obtainable by addition of an alkylene oxide to an alcohol;

B1b a polyether polyol with an OH number of 300-600 mg KOH/g and a functionality of 3.0-6.0, obtainable by addition of an alkylene oxide to a starter compound, wherein the starter compound is at least one of a carbohydrate, a bifunctional alcohol that is not a carbohydrate, or a mixture of the foregoing;

B1c a polyether polyol different from B1b with an OH number of 250-550 mg KOH/g and a functionality of 2.0-4.0, obtainable by addition of an alkylene oxide to an alcohol.

Preferably, B1a is a polyether polyol obtainable by propoxylation of trimethylol propane, more preferably with an OH number of 800-900 mg KOH/g and a functionality of 2.5-3.5. Preferably, B1b is a polyether polyol obtainable by propoxylation of a mixture of sucrose, propylene glycol and ethylene glycol, more preferably with an OH number of 400-500 mg KOH/g and a functionality of 4.0-5.0. Preferably, B1c is a polyether polyol obtainable by propoxylation of glycerol, more preferably with an OH number of 350-450 mg KOH/g and a functionality of 2.5-3.5.

B1a may be present in B1 in an amount of 5.0-40 wt %, preferably 10-35 wt %, more preferably 15-30 wt %, based on the amount of isocyanate-reactive composition B. B1b may be present in an amount of 20-80 wt %, preferably 25-70 wt %, more preferably 30-65 wt %, based on the amount of isocyanate-reactive composition B. B1c may be present in an amount of 2.0-25 wt %, preferably 5.0-20 wt %, more preferably 5.0-15 wt %, based on the amount of isocyanate-reactive composition B.

In the context of this application, the OH number or OH value (OHV) is determined according to ASTM D4274-11, method A.

In the context of this application, functionality f refers to the nominal functionality of an isocyanate-reactive component or mixture of isocyanate-reactive components.

B1 may further comprise B1d low molecular weight isocyanate-reactive components such as di- or trifunctional amines or alcohols with molecular weights of less than 400 g/mol, for example mono- or diethylene glycol, glycerol, ethylene diamine, or any combination of the foregoing. In the context of this application, molecular weight is determined via measurement of the OH number (ASTM D4274-11, method A) and subsequent calculation of the molecular weight, by utilizing the well-known formula: OH number=56100*functionality (f)/molecular weight.

B1d may be present in B1 in an amount of 2.0-25 wt %, preferably 5.0-20 wt %, more preferably 5.0-15 wt %, based on the amount of isocyanate-reactive composition B.

The isocyanate-reactive composition B, may further comprise B3 a blowing agent. Suitable blowing agents include chemical and physical blowing agents. As a chemical blowing agent there may preferably be used water, which forms carbon dioxide by reaction with the isocyanate groups. Examples of physical blowing agents are aliphatic or cycloaliphatic hydrocarbons, preferably those with 4 to 8, more preferably 4 to 6 and most preferably 5 carbon atoms, partially halogenated hydrocarbons or olefins, or ethers, ketones or acetates. A blowing effect can also be achieved by adding compounds that decompose with the evolution of gases. The various blowing agents may be used individually or in mixtures with respect to one another. B3, preferably water, may be present in B in an amount of 0.10-4.0 wt %, based on the amount of isocyanate-reactive composition B, especially in an amount of 0.10-2.0 wt % or 0.25-1.0 wt %, based on the amount of isocyanate-reactive composition B.

The isocyanate-reactive composition B, may further comprise B4 a catalyst composition which may comprise one or more catalyst components. Suitable catalysts are well known and include the conventional activators for the blowing and crosslinking reaction, such as, for example, amines and metal salts. For example, bis(2-dimethylaminoethyl) ether, dimethylethylamine (DMEA), Diethylmethylbenzenediamine (DETDA), N,N-bis(3-dimethylaminopropyl)-N-isopropanolamine, potassium acetate or dimethyltin dilaurate.

The isocyanate-reactive composition B, may further comprise B5 auxiliary and/or additive compounds. Suitable auxiliary and/or additive compounds are known in the art and include surface-active additives such as emulsifiers, foam stabilizers, flame retardants, nucleation agents, antioxidants, colorants, dispersion aids and pigments.

In one aspect, the present invention is related to a method for the production of a polyurethane sandwich element, comprising the steps of:

- i. applying a first fiber material having a first surface and a second surface to a first surface of a core material;
- ii. applying a second fiber material having a first surface and a second surface to a second surface of the core forming a sandwich structure having a first and a second surface wherein the first and second fiber material may be the same or different;
- iii. applying a polyurethane-forming mixture comprising an isocyanate composition and a isocyanate-reactive composition to the first and the second surface of the sandwich structure so that the first and the second surface of the sandwich structure are at least partly covered by the polyurethane-forming mixture forming a polyurethane-forming mixture covered sandwich structure and placing the sandwich structure into a mold, wherein applying the polyurethane-forming composition may take place before, during or after placing the sandwich structure into a mold;
- iv. curing the polyurethane-forming mixture to form the polyurethane sandwich element;
- v. removing the sandwich element from the mold; and
- vi. optionally, post-treating the sandwich element;

wherein the polyurethane-forming mixture comprises

- A an isocyanate composition
- B an isocyanate-reactive composition comprising
  - B1 at least one isocyanate-reactive component having at least two reactive hydrogen atoms;
  - B2 more than 5.0 to less than 9.0 wt % internal mold release, based on the amount of isocyanate-reactive composition B, wherein the internal mold release comprises
    - B2a a first internal mold release agent; and
    - B2b a second internal mold release agent which is a fatty acid and different from B2a.

Said isocyanate-reactive composition B is the inventive isocyanate-reactive composition B and has been described in detail above.

The method of the invention employs a core material having at least two surfaces, namely a first and a second surface. A first fiber material having a first surface and a second surface is applied to the first surface of the core material, and a second fiber material having a first surface and a second surface is applied to the second surface of the core material. The first and second fiber material may be the same or different. They may be applied to the first and second surface of the core material simultaneously or in any order. Application of the first and second fiber material to the core material results in a sandwich structure having a first and a second surface. An isocyanate-reactive composition is applied to the first and second surface of the sandwich structure so that they are at least partly covered by the isocyanate-reactive composition. This application may be conducted before, during or after the sandwich structure is placed in a mold. The polyurethane-forming composition is then cured to form the polyurethane sandwich element which is released from the mold and, optionally, post-treated.

The polyurethane layer of the polyurethane sandwich element of the present invention is formed from a polyurethane-forming mixture. The polyurethane-forming mixture used in the method of the present invention comprises

- A an isocyanate composition
- B the isocyanate-reactive composition according to the invention.

For the isocyanate composition, any suitable isocyanate for use in polyurethanes, polyureas, and mixtures thereof are acceptable, such as organic diisocyanates, which can be any aliphatic, alicyclic, or aromatic isocyanates that have been known to be useful in the preparation of polyurethane. The examples thereof include, but are not limited to, 2,2'-, 2,4'-, and 4,4'-diphenylmethane diisocyanate (monomeric MDI); higher homologues, or oligomers thereof; isophorone diisocyanate (IPDI) or an oligomer thereof; toluene diisocyanate (TDI), for example, a toluene diisocyanate isomer such as toluene-2,4- or 2,6-diisocyanate, or a mixture thereof; tetramethylene diisocyanate or an oligomer thereof; hexamethylene diisocyanate (HDI) or an oligomer thereof; naphthalene diisocyanate (NDI) or any mixture of the foregoing.

The isocyanate may also be used in the form of a polyisocyanate prepolymer. These polyisocyanate prepolymers can be obtained by reacting an excess amount of the above isocyanate compounds with a compound having at least two isocyanate-reactive groups at, for example, 30-100° C., preferably about 80° C.

Preferably, the isocyanate composition comprises an isocyanate of the diphenylmethane diisocyanate series (MDI types), modifications or prepolymers of the foregoing, polymeric MDI or any combination of the foregoing. A preferred isocyanate composition comprises or consists of monomeric MDI, polymeric MDI or a mixture of monomeric and polymeric MDI.

In one embodiment of the invention, the isocyanate composition A comprises or consists of polymeric MDI with an NCO content of 30-33 wt % and a content of monomeric MDI of at least 20 wt %, preferably of at least 30 wt %, more preferably of at least 40 wt %. In the context of this application, the NCO content of an isocyanate is determined according to DIN EN ISO 14896 (2009).

The blowing agent B3, catalyst composition B4 and/or auxiliary and/or additive compounds B5 described above as optional components of the isocyanate-reactive composition B may also be incorporated in the isocyanate composition A.

The isocyanate composition A and isocyanate-reactive composition B are generally reacted in amounts such that the ratio of equivalents of NCO groups of the polyisocyanate to the total equivalents of the reactive hydrogen atoms of the remaining components reactive to isocyanate groups is from 0.80:1.0 to 2.0:1.0, preferably from 0.90:1 to 1.7:1.0 and more preferably 1.3:1.0 to 1.4:1.0. The index of a polyurethane-forming mixture can be calculated by multiplying said ratio of equivalents by 100, i.e., preferred indices of the polyurethane-forming mixture are from 80 to 200, more preferred from 90 to 170, most preferred from 100 to 140.

In one embodiment of the invention, the core material comprises a honeycomb paperboard, a plastic honeycomb, aluminum honeycomb, balsa wood, a rigid foam, compressed or uncompressed cotton fibers, compressed or uncompressed natural fibers, or compressed or uncompressed plastic fibers such as polyethylene terephthalate (PET), or a combination of the foregoing.

Suitable fiber materials, preferably a reinforcing fiber material, for covering the core and forming a sandwich structure include woven fiber mats, non-woven fiber mats, continuous strand fiber, fiber random structures, fiber tissues, chopped fibers, ground fibers, knitted fabrics, or any combination thereof. Preferred fibers are carbon fibers, polymeric fibers, for example or aramide fibers, mineral fibers, glass fibers, natural fibers such as Kenaf, Hemp, coconut or the like, or mixtures thereof.

In one embodiment of the invention, the first fiber material and second fiber material are independently at least one of a reinforcing fiber material, a woven fiber mat, a non-woven fiber mat, a continuous strand fiber, a fiber random structure, a fiber tissue, chopped fibers, ground fibers, a knitted fabric, or a combination of the foregoing.

In one embodiment of the invention, the first fiber material and second fiber material independently comprise at least one of carbon fibers, polymeric fibers, aramide fibers, mineral fibers, glass fibers, natural fibers, or mixtures of the foregoing.

In one aspect, the present invention is related to a polyurethane sandwich element made by the method of the invention, such as an automobile load floor or roof element.

The polyurethane sandwich elements produced in accordance with the present invention may, be laminated with covering layers or decorative substances during the molding step or in a subsequent step after removal from the mold according to known processes. If suitable covering layers or decorative substances are used, the bonding to the polyurethane sandwich element may already take place during the production step by first of all taking the covering layer or decorative substance and at the same time compressing it with the sandwich structure or reinforcing fiber mat in the mold. As decorative materials there may in this connection be used carpets, textiles blocked against impregnation with polyurethane, compact or foamed plastics films, as well as spray skins or RIM skins of polyurethane. As covering layers there may also be used preformed materials suitable for external applications, such as glass, metal foils or sheets, as well as compact thermoplastic composites of PMMA (polymethyl methacrylate), ASA (acrylic ester-modified styrene-acrylonitrile terpolymer), PC (polycarbonate), PA (polyamide), PBT (polybutylene terephthalate) and/or PPO (polyphenylene oxide) in painted, paintable prepared or colored form. As covering layers there may likewise be used continuously or batchwise-produced covering layers based on melamine-phenol, phenol-formaldehyde, epoxy or unsaturated polyester resins.

In one aspect, the present invention is related to a use of an internal mold release B2 in an amount of more than 5.0 to less than 9.0 wt %, based on the amount of isocyanate reactive component B, wherein the internal mold release comprises B2a a first internal mold release agent and B2b a second internal mold release agent which is a fatty acid and different from B2a in the method of the invention.

EXAMPLES

The following raw materials were used within the experimental part. B1=isocyanate-reactive components; B2=internal mold release agents; B3=blowing agents; B4=catalysts; B5=additives Component B

- B1a: trimethylolpropane (TMP)-started polyether polyol; 100% propylene oxide (PO), OHV=850 mg KOH/g, f=3
- B1b: (sucrose+propylene glycol (PG)+ethylene glycol (EG))-started polyether polyol; 100% PO, OHV=450 mg KOH/g, f=4.7
- B1c: glycerol-started polyether polyol; 100% PO, OHV=400, f=3
- B1d: EG, OHV=1805 mg KOH/g, f=2
- B2a: fatty acid ester (polyadipate) (Loxiol G71S, Emery Oleochemicals GmbH)
- B2b: poly unsaturated fatty acids (Edenor TI 05, Brenntag GmbH)
- B3: water
- B4a: diethylmethylbenzenediamine
- B4b: N,N-bis(3-dimethylaminopropyl)-N-isopropanolamine
- B4c: potassium acetate in diethylene glycol (DEG)
- B5a: Isopur black paste
- B5b: Tegostab B8485 (polyether-polydimethylsiloxane-copolymer), foam stabilizer Component A

- ISO1: polymeric MDI, NCO content of 31.4 wt %, fn=2.75, monomer content=49.4 wt %. Isocyanate functionality fn refers to the nominal functionality of the isocyanate.

Parameters and Test Methods

Phase Stability of Component B:

Evaluation of phase stability was conducted via visual inspection. For easy evaluation of phase stability issues, mixtures were prepared without pigmentation since it does not influence phase stability of the mixtures, according to experience of the skilled person. The mixtures were stored in glass vessels at 50° C. for 14 days and were inspected regularly. A mixture was classified as not phase stable if a boundary layer between two or more phases and/or droplet formation occured within 14 days. In contrast to that, a clear, homogeneous or cloudy, homogeneous mixture was defined as phase stable. A phase stable component B is desired.

Release Properties of the Resulting Product:

For comparison of release properties, polyurethane-forming mixtures were poured into a metal ring on top of a heated plate (130° C.). After completed reaction the hardened PU (resulting product) was removed from the heated plate. Two parameters were evaluated:

- the required force for removal of the resulting product from the heated plate was evaluated according to feel of the experimenter; values ascribed to required forces were "very low", "low", "medium", "high" or "very high".
- the heated plate surface was inspected visually regarding residual PU contamination; values ascribed to residual contamination were "no", "very low", "low", "medium", "high" or "very high".

In total, ten demolding cycles were performed for each mixture (Example 1 and Comparative Examples 2-5). Required force for removal and residual contamination were determined after the tenth demolding cycle. Good demolding performance (=release properties) of the resulting product is desired, i.e. very low required force for removal and no residual contamination. Only when both parameters-required force for removal and residual contamination-showed optimum performance ("very low" required force for removal and "no" residual contamination) an overall good demolding performance was attested.

| Component B | Example 1 | Comp. Example 2 | Comp. Example 3 | Comp. Example 4 | Comp. Example 5 | Comp. Example 6 |
|---|---|---|---|---|---|---|
| B1a | 22.2 | 22.8 | 20.9 | 22.2 | 22.2 | 20.49 |
| B1b | 45.0 | 46.0 | 42.3 | 45 | 45 | 41.42 |
| B1c | 9.5 | 9.7 | 8.9 | 9.5 | 9.5 | 8.74 |
| B1d | 8.0 | 8.2 | 7.5 | 8.0 | 8.0 | 7.36 |
| B2a | 5.0 | 3.0 | 10.0 | — | 7.0 | 7.0 |
| B2b | 2.0 | 2.0 | 2.0 | 7.0 | — | 6.5 |
| B3 | 0.5 | 0.5 | 0.5 | 0.5 | 0.5 | 0.5 |
| B4a | 2.25 | 2.25 | 2.25 | 2.25 | 2.25 | 2.25 |
| B4b | 0.35 | 0.35 | 0.35 | 0.35 | 0.35 | 0.35 |
| B4c | 0.30 | 0.30 | 0.30 | 0.30 | 0.30 | 0.30 |
| B5a | 4.94 | 4.94 | 4.94 | 4.94 | 4.94 | 4.94 |
| B5b | 0.15 | 0.15 | 0.15 | 0.15 | 0.15 | 0.15 |
| Component A | ISO 1 | ISO 1 | ISO 1 | ISO 1 | ISO 1 | ISO 1 |
| Index | 110 | 110 | 110 | 110 | 110 | 110 |
| Phase stability of component B without B5a | Yes | Yes | No, droplet formation after 7 days | Yes | No, droplet formation after 11 days | No, phase separation after 4 days |
| Required force for removal | Very low from first demolding | High | Low from first demolding | High | Low from first demolding | Very low from first demolding |
| Residual contamination | No | Low | High | Very high | Low | No |

For all shown (Comparative) Experiments, the same component A=ISO1 was used in an amount to achieve an index of 110. In Example 1, a component B according to the invention was used. In Comparative Examples 2-5, components B not according to the invention were used.

Example 1 shows the desired combination of phase stability of component B and very good release properties of the resulting product (required force for removal as well as residual contamination). This is due to the inventive combination of the two different internal mold release agents in the inventive concentration of in total 5<x<9 wt %.

Comparative Example 2 features a component B which comprises only 5 wt % of the same combination of internal mold release agents as in Example 1. The component B is phase stable. However, the resulting product shows bad release properties (high required force for removal) which are believed to be due to the reduced amount of internal mold release agents has bad release properties.

Comparative Example 3 features a component B which comprises an increased concentration of the internal mold release agent combination. The resulting product shows bad release properties (high residual contamination of the mold), and the component B is not phase stable, but droplet formation is observed after storage at 50° C. for 7 days.

Comparative Example 4 features a phase stable component B which does not comprise the inventive internal mold release, but only comprises a single internal mold release agent in a concentration of 7 wt %. Release properties of the resulting product are bad (required force for removal as well as residual contamination).

Comparative Example 5 features a component B which does not comprise the inventive internal mold release, but only comprises a single internal mold release agent, different from that used in Comparative Example 4, in a concentration of 7 wt %. The component B shows droplet formation after storage at 50° C. for 11 days and is thus not phase stable. Release properties of the resulting product are bad (residual contamination).

Comparative Example 6 features a component B which comprises an increased concentration of the internal mold release agent combination but wherein the individual amounts of both internal mold release agents are within the inventive amount of 5.0 to less than 9.0 wt % for the total of internal mold release. The resulting product shows good release properties (low required force for removal and no residual contamination of the mold), but the component B is not phase stable, as phase separation is observed after storage at 50° C. for 4 days.

Example 1 and Comparative Examples 2-6 show that only the inventive isocyanate-reactive composition comprising more than 5.0 to less than 9.0 wt % internal mold release comprising two different internal mold release agents leads to the desired combination of properties.

Sandwich parts were produced with Example 1 in a spray compression molding process, comprising the steps of:

i. applying a glass fiber material (Oschatz MA 644-450) at both sides of a paper honeycomb (Axxor HC-CLG-140-1400 Oct. 12.0-N);

ii. applying the polyurethane-forming mixture according to Example 1 to the first and the second surface of the sandwich structure so that the first and the second surface of the sandwich structure were at least partly covered by the polyurethane-forming mixture forming a polyurethane-forming mixture covered sandwich structure and subsequently placing the sandwich structure into a metal mold, that had been treated once with an external mold release agent before the first part was placed in the mold; no additional external release agent was used in the following;

iii. curing the polyurethane-forming mixture to form the polyurethane sandwich element in the closed mold at 130° C. for 60 s;

iv. removing the sandwich element from the mold;

v. evaluating the demolding performance, the purity of the mold and the sandwich element quality.

After production and demolding of 80 sandwich elements in a given mold (without using any additional external release agent besides the treatment with external release agent prior to the first demolding mentioned before), the sandwich element quality was still fine, and the mold pollution was still sufficiently low to continue production of further sandwich elements.

The invention claimed is:

1. An isocyanate-reactive composition B comprising:

B1) at least one isocyanate-reactive component having at least two reactive hydrogen atoms;

B2) more than 5.0 to less than 9.0 wt % of an internal mold release, based on the amount of isocyanate-reactive composition B; and B3) at least one blowing agent, wherein the internal mold release comprises:

B2a) a first internal mold release agent; and

B2b) a second internal mold release agent which is a fatty acid and different from B2a, wherein the second internal mold release agent B2b is present in an amount of 1.0-4.0 wt %, based on total weight of the isocyanate-reactive composition B, and wherein the at least one isocyanate-reactive component having at least two reactive hydrogen atoms B1 comprises:

B1a) a polyether polyol with an OH number of 700-1000 mg KOH/g and a functionality of 2.0-4.0, obtained by addition of an alkylene oxide to an alcohol;

B1b) a polyether polyol with an OH number of 300-600 mg KOH/g and a functionality of 3.0-6.0, obtained by addition of an alkylene oxide to a starter compound, wherein the starter compound comprises at least one of a carbohydrate, a bifunctional alcohol that is not a carbohydrate, or a mixture of the foregoing; and B1c) a polyether polyol different from B1b with an OH number of 250-550 mg KOH/g and a functionality of 2.0-4.0, obtained by addition of an alkylene oxide to an alcohol.

2. The isocyanate-reactive composition B of claim 1 wherein the first internal mold release agent B2a is a fatty acid ester.

3. The isocyanate-reactive composition B of claim 1, wherein the first internal mold release agent B2a is present in an amount of 2.0-8.0 wt %, based on total weight of the isocyanate-reactive composition B.

4. The isocyanate-reactive composition B of claim 1, wherein the internal mold release B2 is present in an amount of 5.5-8.5 wt %, based on total weight of the isocyanate-reactive composition B.

5. A method for producing a polyurethane sandwich element, comprising:

i. applying a first fiber material having a first surface and a second surface to a first surface of a core material;

ii. applying a second fiber material having a first surface and a second surface to a second surface of the core to form a sandwich structure having a first and a second surface wherein the first and second fiber material may be the same or different;

iii. applying a polyurethane-forming mixture comprising an isocyanate composition and a isocyanate-reactive composition to the first and the second surface of the sandwich structure so that the first and the second surface of the sandwich structure are at least partly covered by the polyurethane-forming mixture to form a polyurethane-forming mixture covered sandwich structure and placing the sandwich structure into a mold, wherein applying the polyurethane-forming composition may take place before, during or after placing the sandwich structure into a mold;

iv. curing the polyurethane-forming mixture to form the polyurethane sandwich element;

v. removing the sandwich element from the mold; and vi. optionally, post-treating the sandwich element;

wherein the polyurethane-forming mixture comprises:

A) an isocyanate composition; and

B) the isocyanate-reactive composition of claim 1.

6. The method of claim 5, wherein the isocyanate composition A comprises polymeric MDI with an NCO content of 30 to 33 wt % and a content of monomeric MDI of at least 20 wt %.

7. The method of claim 5, wherein the core material comprises a honeycomb paperboard, a plastic honeycomb, aluminum honeycomb, balsa wood, a rigid foam, compressed or uncompressed cotton fibers, compressed or uncompressed natural fibers, or compressed or uncompressed plastic fibers, or a combination of the foregoing.

8. The method of claim 5, wherein the first fiber material and second fiber material are independently at least one of a reinforcing fiber material, a woven fiber mat, a non-woven fiber mat, a continuous strand fiber, a fiber random structure, a fiber tissue, chopped fibers, ground fibers, a knitted fabric, or a combination of the foregoing.

9. The method of claim 5, wherein the first fiber material and second fiber material independently comprise at least one of carbon fibers, polymeric fibers, aramide fibers, mineral fibers, glass fibers, natural fibers, or a mixture of the foregoing.

10. A polyurethane produced from the isocyanate-reactive composition according to claim 1.

11. A polyurethane sandwich element comprising the polyurethane of claim 10.

12. The isocyanate-reactive composition B of claim 3, wherein the first internal mold release agent B2a is present in an amount of 4.0-7.0 wt %, based total weight of the isocyanate-reactive composition B.

13. The isocyanate-reactive composition B of claim 4, wherein the internal mold release B2 is present in an amount of 6.0-8.0 wt %, based on total weight of the isocyanate-reactive composition B.

14. The method of claim 6, wherein the isocyanate composition A consists of polymeric MDI with an NCO content of 30 to 33 wt % and a content of monomeric MDI of at least 20 wt %.

15. The method of claim 6, wherein the isocyanate composition A comprises polymeric MDI with an NCO content of 30 to 33 wt % and a content of monomeric MDI of at least 30 wt %.

16. The isocyanate-reactive composition B of claim 1, wherein:

(i) polyether polyol B1a is a propoxylation product of trimethylol propane;

(ii) polyether polyol B1b is a propoxylation product of a mixture of sucrose, propylene glycol and ethylene glycol; and (iii) polyether polyol Blc is a propoxylation product of glycerol.

17. The isocyanate-reactive composition B of claim 16, wherein:

(i) polyether polyol Bla has an OH number of 800-900 mg KOH/g and a functionality of 2.5-3.5;

(ii) polyether polyol B1b has an OH number of 400-500 mg KOH/g and a functionality of 4.0-5.0; and (iii) polyether polyol Blc has an OH number of 350-450 mg KOH/g and a functionality of 2.5-3.5.

18. The isocyanate-reactive composition B of claim 1, wherein:

(i) polyether polyol B1a is present in an amount of 5.0-40 wt %, based on total weight of the isocyanate-reactive composition B;

(ii) polyether polyol B1b is present in an amount of 20-80 wt %, based on total weight of the isocyanate-reactive composition B; and (iii) polyether polyol B1c is present in an amount of 2.0-25 wt %, based on total weight of the isocyanate-reactive composition B.

19. The isocyanate-reactive composition B of claim 1, wherein the blowing agent B3 is present in amount of 0.10-4.0 wt %, based on total weight of the isocyanate reactive composition B.

20. The isocyanate-reactive composition B of claim 1, wherein the blowing agent B3 is water.

* * * * *